(12) United States Patent
Hodson

(10) Patent No.: US 6,446,546 B1
(45) Date of Patent: Sep. 10, 2002

(54) MARINADING AND STORAGE CONTAINER

(76) Inventor: Glen Hodson, PO Box 4976, Kailua-Kona, HI (US) 96745

( * ) Notice: Subject to any disclaimer, the term of this patent is extended or adjusted under 35 U.S.C. 154(b) by 0 days.

(21) Appl. No.: 09/690,488

(22) Filed: Oct. 17, 2000

(51) Int. Cl.$^7$ ................................................. A47J 37/10
(52) U.S. Cl. ........................ 99/347; 99/426; 220/573.1; 220/912
(58) Field of Search ........................... 99/347, 345, 346, 99/426, 339, 340; 426/113, 129, 523; 220/573.1, 4.21, 4.22, 4.24, 912; D9/425, 429, 418

(56) References Cited

U.S. PATENT DOCUMENTS

| | | | |
|---|---|---|---|
| 642,507 A | * 1/1900 | Topping | 99/347 |
| 882,094 A | * 3/1908 | Boyd | 99/347 |
| 1,837,535 A | * 12/1931 | Duffey et al. | 99/426 |
| 1,987,491 A | 1/1935 | Nejelski | |
| 2,336,699 A | * 12/1943 | Neth et al. | 99/347 X |
| 2,814,381 A | 11/1957 | Stevick | |
| D220,751 S | 5/1971 | Artz | D9/219 |
| 3,676,159 A | 7/1972 | Fallowfield | |
| 3,758,312 A | 9/1973 | Peters | |
| 3,895,120 A | 7/1975 | Backus | 426/396 |
| D295,830 S | 5/1988 | Holly | D9/420 |
| 4,874,083 A | 10/1989 | Antoni et al. | 206/45.32 |
| 5,057,332 A | 10/1991 | Davidson et al. | 426/281 |
| 5,085,879 A | 2/1992 | Elbaz | |
| D341,316 S | 11/1993 | Fritz et al. | D9/429 |
| 5,607,709 A | 3/1997 | Fritz et al. | 426/106 |
| D394,807 S | 6/1998 | Krupa et al. | D9/429 |
| 5,820,904 A | 10/1998 | Mello et al. | 426/119 |
| 5,878,656 A | * 3/1999 | Fletcher et al. | 99/340 |
| D415,025 S | 10/1999 | McCann | D9/429 |
| 6,042,856 A | 3/2000 | Sagan et al. | 426/87 |

* cited by examiner

Primary Examiner—Reginald L. Alexander
(74) Attorney, Agent, or Firm—Michael R. McKenna

(57) ABSTRACT

A marinading and storage container that holds a chicken in place allowing the container to be turned upside down to advance the marinading process and that resembles the chicken from the outside with a breast and legs that support the container in the upside down position.

2 Claims, 1 Drawing Sheet

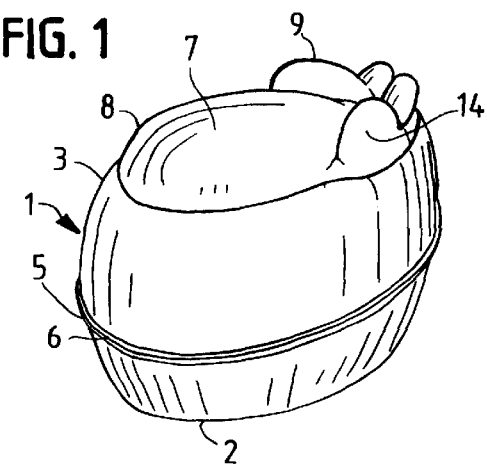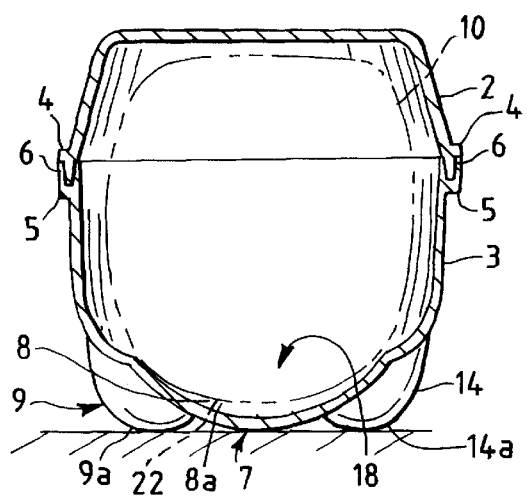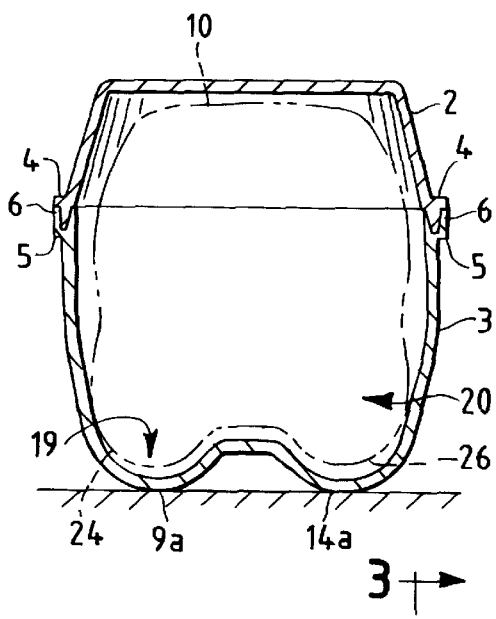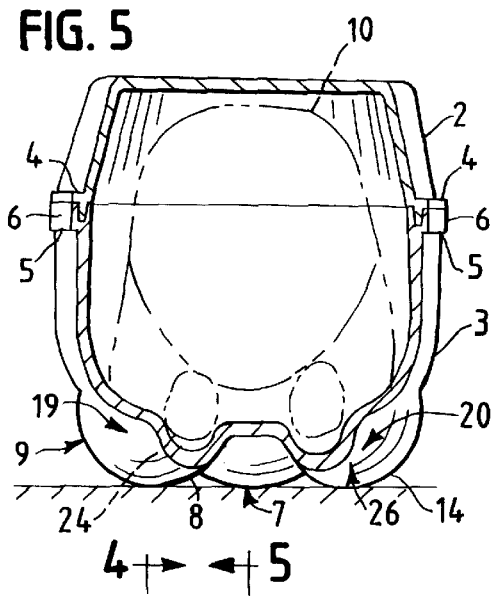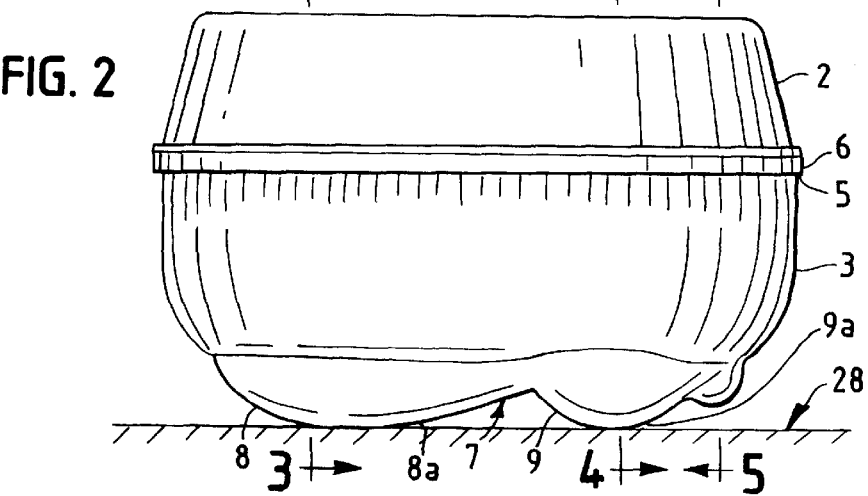

US 6,446,546 B1

MARINADING AND STORAGE CONTAINER

BACKGROUND OF THE INVENTION

This invention relates to a marinading and storage container for food comprising a base dish and a cover with means for uniquely stabilizing the food. Because this is a marinading container, it is provided that the base dish and cover sealably mate so that the container can be turned upside down to advance the marinading process. Food stabilization is important to hinder rotation of the food item within the container and to allow the container to be stable in an upside down position.

Food stabilization is accomplished with the instant invention by having at least one of (i) a top outer surface of the cover with a plurality of protrusions, each with an upward crest that lies in a plane, so that the container can be turned upside down and supported on a flat surface; and (ii) an inner cavity of the cover with a plurality of concavities, each of which is adapted to receive at least a portion of a side surface of the food item as the cover is rotated to disposed it upside down.

In this way, the marinading and storage container can be turned upside down and supported on a flat surface by the plurality of protrusions of the cover, after the cover is placed over the food item with at least a portion of the food item disposed in at least one of the plurality of concavities to stabilize said food item within the marinading and storage container.

In addition to the foregoing advantages over the prior art, the visible protrusions of the marinading and storage container of this useful invention are preferably representative of the food item inside. The marinading and storage container can be made of an opaque material and the user will nonetheless know the contents inside. Moreover, the internal concavities provide enhanced contact between the marinading fluid and the surface of the food item. Pools of marinading fluid will bathe the portions of the food item disposed therein.

In U.S. Pat. No. 5,607,709, a disposable microwavable food container is disclosed with a domed lid and a base having a raised rib floor. A chicken container design shown in U.S. Des. Pat. No. 394,807 shows a lid with a flat surface, which is similar to U.S. Des. Pat. No. 295,830.

In U.S. Pat. No. 6,042,856, a shrimp container with a display and holding base is disclosed. The '856 patent teaches that the base side wall 52 includes a plurality of slots or indentations 52 for displaying, transporting and holding respective individual shrimps. (Col.5, lns. 60–62). Unlike the instant invention, it is not suggested that the shrimp display container should be turned upside down. On the contrary, in addressing the '856 cover, the concern is with containing liquids, such as shrimp purge. (Col.3, lns. 9–21). Nowhere is it suggested that the top wall of the cover engages shrimp that are disposed in the plurality of slots of the base. It is only suggested that the top wall 18 of the cover 12 may be intaglioed with an attractive design. (Col.3, lns. 5–8).

To alleviate these problems, and others which will become apparent from the disclosure which follows, the cover of the instant invention provides both contents stabilization and stabilizes the container itself when it is disposed upside down to further the marinading process. After the cover is placed over the food item with at least a portion of the food item disposed in at least one of the plurality of concavities to stabilize said food item within the marinading and storage container, the container can be rotated in unison with the food item and the portion of the food item disposed in at least one of the plurality of concavities can bathe in the marinading fluid.

Obviously, the inner surface of the base dish may also be provided with contour resembling the back side of a food item or chicken to further enhance stabilization.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

Still other advantages will be apparent from the disclosure that follows.

SUMMARY OF THE INVENTION

The invention relates to a marinading and storage container for food comprising a base dish and a cover with means for stabilizing the food. The base dish is adapted to sealably mate with the cover.

The means for stabilizing the cover of the marinading and storage container of the present invention comprises a top outer surface having a plurality of protrusions. Each of the plurality of protrusions has an upward crest that lies in a plane. The marinading and storage container can be turned upside down and supported on a flat surface by the plurality of protrusions of the cover.

In a preferred embodiment of the marinading and storage container of the present invention, the means for stabilizing the cover comprises an inner cavity resembling a side surface of a food item disposed therein. The inner cavity has a plurality of concavities, each of which is adapted to receive at least a portion of the side surface of the food item when the cover is disposed upside down. The cover can be placed over the food item with at least a portion of the food item disposed in at least one of the plurality of concavities to stabilize said food item within the marinading and storage container. The concavities tend to collect marinading fluid when the container is disposed upside down and the portions of the food item disposed in the concavities are bathed in the collected marinading fluid.

Preferably, the means for stabilizing of the cover of the marinading and storage container comprises a top outer surface having a plurality of protrusions, each of which has an upward crest that lies in a plane and an inner cavity resembling a side surface of a food item disposed therein, said inner cavity has a plurality of concavities, each of which is adapted to receive at least a portion of the side surface of the food item when the cover is disposed upside down, and an inner cavity resembling a side surface of a food item disposed therein, said inner cavity has a plurality of concavities, each of which is adapted to receive at least a portion of the side surface of the food item when the cover is disposed upside down.

In this way, the marinading and storage container can be turned upside down and supported on a flat surface by the plurality of protrusions of the cover, after the cover is placed over the food item with at least a portion of the food item disposed in at least one of the plurality of concavities to stabilize said food item within the marinading and storage container.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims are regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 1 is a perspective view of the marinading and storage container for a dressed chicken with the cover sealably mated to the base dish showing the cover having a top outer surface resembling the breast side of a dressed chicken with a first protrusion resembling a chicken breast of the dressed chicken, a second protrusion resembling one of the two chicken legs of the dressed chicken, and a third protrusion resembling the other of the two chicken legs of the dressed chicken;

FIG. 2 is a side elevation view of the marinading and storage container for a dressed chicken disposed upside down with the crest of the protrusions lying in a horizontal plane to support the container and further showing the peripheral ledge of the base dish and the peripheral lip of the cover thereby supported generally horizontally to resist leaks;

FIG. 3 is a cross-sectional view taken along the line 3—3 of FIG. 2, showing the breast of a dressed chicken (shown in phantom lines) disposed inside the upside down marinading and storage container with a portion of the chicken breast of a dressed chicken disposed in a first concavity of the cover;

FIG. 4 is a cross-sectional view taken along the line 4—4 of FIG. 2, showing a dressed chicken (shown in phantom lines) disposed inside the upside down marinading and storage container with a portion of the broadest portion of a leg disposed in each of a second concavity and a third concavity of the cover; and FIG. 5 is a cross-sectional view taken along the line 5—5 of FIG. 2, showing a dressed chicken (shown in phantom lines) disposed inside the upside down marinading and storage container with a portion of the ankle portion of a leg disposed in each of a second concavity and a third concavity of the cover.

DETAILED DESCRIPTION OF THE INVENTION

The invention relates to a marinading and storage container for food comprising a base dish and a cover with means for stabilizing the food. The base dish is adapted to sealably mate with the cover.

The means for stabilizing of the cover of the marinading and storage container of the present invention comprises a top outer surface having a plurality of protrusions. Each of the plurality of protrusions has an upward crest that lies in a plane. The marinading and storage container can be turned upside down and supported on a flat surface by the plurality of protrusions of the cover.

In a preferred embodiment of the marinading and storage container of the present invention, the means for stabilizing of the cover comprises an inner cavity resembling a side surface of a food item disposed therein. The inner cavity has a plurality of concavities, each of which is adapted to receive at least a portion of the side surface of the food item when the cover is disposed upside down. The cover can be sealably mated with the base containing the food item with at least a portion of the food item disposed in at least one of the plurality of concavities to stabilize said food item within the marinading and storage container. The concavities tend to collect marinading fluid when the container is disposed upside down and the portions of the food item disposed in the concavities are bathed in the collected marinading fluid.

Preferably, the means for stabilizing of the cover of the marinading and storage container comprises a top outer surface having a plurality of protrusions, each of which has an upward crest that lies in a plane and an inner cavity resembling a side surface of a food item disposed therein, said inner cavity has a plurality of concavities, each of which is adapted to receive at least a portion of the side surface of the food item when the cover is disposed upside down, and an inner cavity resembling a side surface of a food item disposed therein, said inner cavity has a plurality of concavities, each of which is adapted to receive at least a portion of the side surface of the food item when the cover is disposed upside down.

In this way, the marinading and storage container can be turned upside down and supported on a flat surface by the plurality of protrusions of the cover, after the cover is placed over the food item with at least a portion of the food item disposed in at least one of the plurality of concavities to stabilize said food item within the marinading and storage container.

Without departing from the generality of the invention disclosed herein and without limiting the scope of the invention, the discussion that follows, will refer to the invention as depicted in the drawing.

The preferred embodiments of the apparatus depicted in the drawing comprise a marinading and storage container for dressed chicken 1, as shown in FIG. 1, comprising a base dish 2 and a cover 3. The base dish is adapted to sealably mate with the cover. As best shown in any of FIGS. 3–5, the base dish has a generally horizontal peripheral ledge 4 and the cover has a downward flange 6 extending from a generally horizontal peripheral lip 5 to resist leaks. Those skilled in the art will understand and appreciate any number of conventional sealing means with which to provide leak resistance. All such means are contemplated herein. Moreover, the cover 3 further has a top outer surface 7 resembling the breast side of a dressed chicken 10 having two chicken legs 11 with a first protrusion 8 resembling a chicken breast of the dressed chicken, a second protrusion 9 resembling one of the two chicken legs of the dressed chicken, and a third protrusion 14 resembling the other of the two chicken legs of the dressed chicken. As best shown in FIG. 2, each of said protrusions (8, 9, and 14, respectively) having an upward crest (8a, 9a, and 14a, respectively) that lies in a plane.

The base dish 2 of the marinading and storage container can be mated with the cover 3, turned upside down and supported on a flat surface by the first, second and third protrusions of the cover, as best shown in FIG. 2.

In another embodiment of the present invention, a marinading and storage container comprises a base dish 2 and a cover 3, wherein the base dish is adapted to sealably mate with the cover. As best shown in FIGS. 3–5, the cover 3 has an inner cavity resembling the breast side of a dressed chicken having two chicken legs with a first concavity 18 resembling a chicken breast of the dressed chicken, a second concavity 19 resembling one of the two chicken legs of the dressed chicken, and a third concavity 20 resembling the other of the two chicken legs of the dressed chicken.

As best shown in FIG. 3, the first concavity 18 is adapted to receive at least a portion of the chicken breast 22 of a dressed chicken when the cover is disposed upside down. Referring to FIGS. 4 and 5, the second concavity 19 is adapted to receive at least a portion of one of the two chicken legs 24 of the dressed chicken when the cover is disposed upside down, and the third concavity 20 is adapted to receive at least a portion of the other of the two chicken legs 26 of the dressed chicken when the cover is disposed upside down. Thus, a dressed chicken 10 can be enclosed in the marinading and storage container with at least a portion of the chicken breast disposed in the first concavity, with at least a portion of one of the two chicken legs disposed in the second concavity, and with at least a portion of the other of the two chicken legs disposed in the third concavity to stabilize said dressed chicken within the marinading and storage container.

Preferably, in the marinading and storage container 1 of the present invention, the cover 3 has, in addition to the inner surface configuration referenced in the previous paragraph, a top outer surface 7 resembling the breast side of a dressed chicken having two chicken legs with a first protrusion 8 resembling a chicken breast of the dressed chicken, a second protrusion 9 resembling one of the two chicken legs of the dressed chicken, and a third protrusion 14 resembling the other of the two chicken legs of the dressed chicken. Each of said protrusions having an upward crest that lies in a plane, as shown in FIG. 2. Preferably, as shown in FIG. 2, the plane in which each of the upward crests of said protrusions is parallel to the plane of the horizontal lip to reduce spillage of a marinading fluid. The base dish 2 of the marinading and storage container 1 can be mated with the cover 3, turned upside down and supported on a flat surface 28 by the first, second and third protrusions (8, 9, and 14, respectively) of the cover.

The marinading and storage container of this invention can be constructed of materials suitable for the purpose, including various plastics, glass, and stoneware. Such material selection is of importance if the container is to be used in the oven or microwave. Other materials of construction will be apparent to those skilled in the art. Conventional manufacturing techniques can be employed.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scop of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A marinading and storage container for dressed chicken comprising a base dish and a cover, said base dish being adapted to sealably mate with the cover, said cover further having a top outer surface resembling the breast side of a dressed chicken having two chicken legs with a first protrusion resembling a chicken breast of the dressed chicken, a second protrusion resembling one of the two chicken legs of the dressed chicken, and a third protrusion resembling the other of the two chicken legs of the dressed chicken, and each of said protrusions having an upward crest that lies in a plane, whereby, the base dish of the marinading and storage container can be mated with the cover, turned upside down and supported on a flat surface by the first, second and third protrusions of the cover.

2. A marinading and storage container comprising a base dish and a cover, said base dish being adapted to sealably mate with the cover, said cover further having an inner cavity resembling the breast side of a dressed chicken having two chicken legs with a first concavity resembling a chicken breast of the dressed chicken, a second concavity resembling one of the two chicken legs of the dressed chicken, and a third concavity resembling the other of the two chicken legs of the dressed chicken, said first concavity being adapted to receive at least a portion of the chicken breast of a dressed chicken when the cover is disposed upside down, said second concavity being adapted to receive at least a portion of one of the two chicken legs of the dressed chicken when the cover is disposed upside down, and said third concavity being adapted to receive at least a portion of the other of the two chicken legs of the dressed chicken when the cover is disposed upside down, and wherein the cover further has a top outer surface resembling the breast side of a dressed chicken having two chicken legs with a first protrusion resembling a chicken breast of the dressed chicken, a second protrusion resembling one of the two chicken legs of the dressed chicken, and a third protrusion resembling the other of the two chicken legs of the dressed chicken, and each of said protrusions having an upward crest that lies in a plane, whereby, the cover can be placed over a dressed chicken with at least a portion of the chicken breast disposed in the first concavity, with at least a portion of one of the two chicken legs disposed in the second concavity, and with at least a portion of the other of the two chicken legs disposed in the third concavity to stabilize said dressed chicken within the marinading and storage container, and the base dish of the marinading and storage container can be mated with the cover, turned upside down and supported on a flat surface by the first, second and third protrusions of the cover.

\* \* \* \* \*